Jan. 7, 1958  L. P. COZZENS  2,819,111
PIPE HANDLING TOOL
Filed April 12, 1954
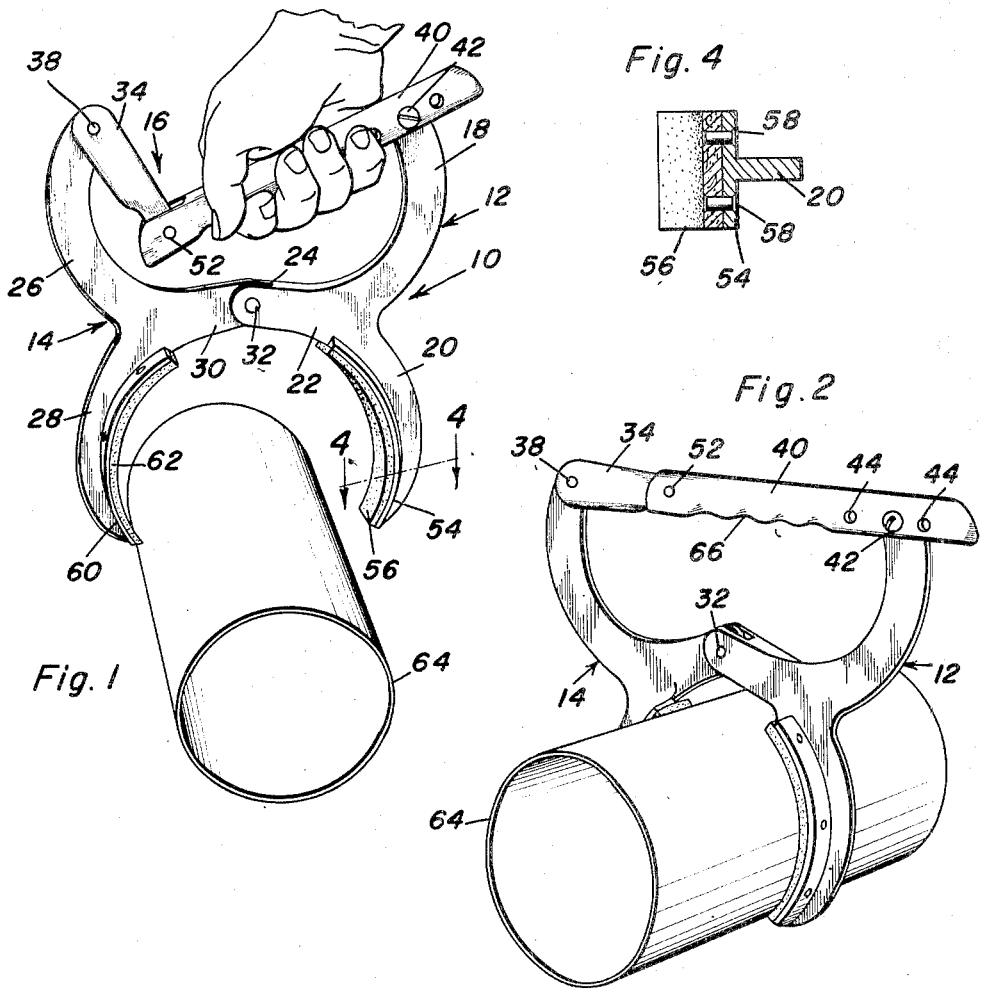
Larnce P. Cozzens
INVENTOR.
BY *Clarence A. O'Brien*
*and Harvey B. Jacobson*
Attorneys United States Patent Office 2,819,111
Patented Jan. 7, 1958

2,819,111

PIPE HANDLING TOOL

Larnce P. Cozzens, Lamesa, Tex., assignor to San Angelo Die Casting & Manufacturing Co., San Angelo, Tex., a copartnership Application April 12, 1954, Serial No. 422,486

3 Claims. (Cl. 294—26)

This invention relates in general to improvements in hand tools, and more specifically to an improved pipe handling tool.

While there have been devised numerous types of tools for handling pipe and other similar objects, there has not been provided a suitable tool for handling pipe of the type utilized in irrigation lines. Such pipes are normally formed of a light gauge aluminum and are easily bent out of shape. Inasmuch as irrigation lines are handled many times, it is necessary that a tool for handling them be of such a nature that it would not bend or dent the pipe during the handling thereof.

It is therefore the primary object of this invention to provide an improved pipe handling tool which is so constructed whereby it will firmly grasp a pipe to permit ease of handling of such pipe and at the same time, will not exert extreme pressures on the pipe to cause denting or bending thereof.

Another object of this invention is to provide an improved pipe handling tool which is so constructed whereby it will fit a number of different sizes of pipe and at the same time, will exert substantially the same pressure on each of the various sizes of pipe.

Another object of this invention is to provide an improved pipe handling tool which includes a pair of tong members pivotally connected together and having their upper ends connected by a handle, the handle being collapsible to permit the ready positioning of the pipe handling tool relative to a pipe, and at the same time, being pivotable to a lifting position in which position it limits the inward movement of lower portions of the tong members so as to prevent the exertion of compressive forces on a pipe being carried thereby.

A further object of this invention is to provide an improved pipe handling tool which includes tong members having pipe engageable portions, the pipe engageable portions being part of a suitable liner for fixedly engaging the exterior of a pipe so that the pipe may be rotated through the use of the pipe handling tool.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the pipe handling tool which is the subject of this invention and shows the same in an open position preparatory to the insertion over a pipe to be handled;

Figure 2 is a rotated perspective view of the pipe handling tool and pipe of Figure 1 and shows the pipe handling tool engaged with the pipe;

Figure 3 is an enlarged fragmentary vertical sectional view taken through the handle of the pipe handling tool and shows the general construction thereof and its relationship to upper ends of tong members of the pipe handling tool; and Figure 4 is an enlarged transverse horizontal sectional view taken substantially upon the plane indicated by the section line 4—4 of Figure 1 and shows the general construction of a pipe engaging portion of one of the tong members.

Referring now to the drawings in detail, it will be seen that the pipe handling tool, which is the subject of this invention, is referred to in general by the reference numeral 10. The pipe handling tool 10 is formed of a pair of tong members which are referred to in general by reference numerals 12 and 14 and which have their upper ends connected together by a handle which is referred to in general by the reference numeral 16.

The tong member 12 includes an arcuate upper portion 18 and an arcuate lower portion 20 which have their adjacent portions connected together by an inwardly extending arm 22. The arm 22 terminates at its inner end in a bifurcation 24.

The tong member 14 is almost identical in outline with the tong member 12 and includes an upper arcuate portion 26 and a lower arcuate portion 28. The arcuate portions 26 and 28 are connected together by an inwardly projecting arm 30. The arm 30 has the inner end thereof disposed within the bifurcation 24 and pivotally connected thereto by a transverse pivot pin 32. In this manner, the tong members 12 and 14 are pivotally connected together.

Referring now to Figure 3 in particular, it will be seen that the handle 16 includes a relatively short section 34 which is provided at its outer end with a bifurcation 36 in which is received the upper end of the tong member 14. The upper end of the tong member 14 is pivotally connected to the bifurcation 36 by a transverse pivot pin 38.

The handle 16 also includes an elongated section 40 whose outer portion is provided in the underside thereof with an elongated slot 42. Received in the slot 42 is the upper end of the tong member 12. The section 40 is provided in the vicinity of the slot 42 with a plurality of longitudinally spaced apertures 44 which are intended to receive a pivot pin 46. The pivot pin 46 pivotally connects the upper end of the tong member 12 to the handle section 40.

It will be noted that the inner end of the handle section 40 is provided with an upwardly and inwardly open socket 48 in which is received a reduced inner portion 50 of the handle section 34. The handle section 34 is pivotally connected to the handle section 40 by a transverse pivot pin 52.

It will be noted that the lower arcuate portion 20 has secured to the inner face thereof an arcuate shoe 54 which extends transversely of the general plane of the lower portion 20. Secured to the shoe 54 is a lining 56, the lining being connected to the shoe 54 by spaced rivets 58. The lower portion 28 is provided with a similar shoe 60 which has secured thereto a lining 62.

It will be noted that there is illustrated a pipe 64. Although the pipe handling tool 10 may be utilized in handling any type of pipe, in order to describe a preferred use for the pipe handling tool 10, it is to be understood that the pipe 64 is irrigation pipe and that it is made of a light gauge aluminum. Thus, it will be seen that the pipe 64 may be easily bent by the application of compressive pressures thereon.

Referring now to Figure 1 in particular, it will be seen that when it is desired to engage the pipe handling tool 10 with the pipe 64, the handle 16 is collapsed or broken by pivoting the handle sections 34 and 40 downwardly. This permits the lower portions 20 and 28, which are actually pipe engaging portions, to move apart. The pipe engaging portions 20 and 28 are then disposed on opposite sides of the pipe 64. Next, upward pressure is placed on the handle section 40 which includes a grip portion 66. This results in the upward pivoting of the handle sections 34 and 40 and the locking of the handle sections into a rigid unit. At the same time, the upper ends of the tong members 12 and 14 are urged apart with the result that the pipe 64 is firmly gripped between the linings 56 and 62 of the pipe engaging portions 20 and 28, respectively. It is to be understood that the shoes 54 and 60 are so configured whereby the linings 56 and 62 snugly fit the pipe 64 so as to retain it against turning due to the friction properties of the linings 62 and 56 and at the same time, do not compressively engage the pipe 64 with sufficient force to dent it. Thus, it will be seen that the pipe 64 may not only be easily carried by the use of the pipe handling tool 10, but may be rotated as desired so as to interlock it with another pipe (not shown).

The widely used size of irrigation pipe in a 5″ pipe. However, 4″ and 6″ pipes are also utilized in some instances. Therefore, it is to be assumed for purposes of illustration that the pipe 64 is a 5″ pipe. In order that the pipe 64 may be properly gripped by the tong members 12 and 14, it will be seen that the pivot pin 46 for the tong member 12 is placed in the middle one of the apertures 44. In the event a 4″ pipe is to be handled, the pivot pin 46 would then be moved to the outermost one of the apertures 44. Similarly, if a larger pipe is to be handled, the pivot pin 46 would be moved to the innermost of the apertures 44.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A pipe handling tool comprising a pair of spaced tong members, each of said tong members having an upper portion and a lower pipe engaging portion, a pivot pivotally connecting together intermediate portions of said tong members, said upper and lower portions of each tong member being on the same side of said pivot, a handle pivotally connected at its end portions to said upper portions of said tong members and extending therebetween, said handle being formed in sections, a pivot pivotally connecting said sections together intermediate the ends of said handle, said sections having abutting surfaces disposed below said last-mentioned pivot to form a rigid unit of said sections when upward pressure is applied to said handle.

2. A pipe handling tool comprising a pair of spaced tong members, each of said tong members having an upper portion and a lower pipe engaging portion, a pivot pivotally connecting together intermediate portions of said tong members, said upper and lower portions of each tong member being on the same side of said pivot, a handle pivotally connected at its end portions to said upper portions of said tong members and extending therebetween, said handle being formed in sections, a pivot pivotally connecting said sections together intermediate the ends of said handle, said sections having abutting surfaces disposed below said last-mentioned pivot to form a rigid unit of said sections when upward pressure is applied to said handle, means adjustably securing said handle to at least one of said tong members whereby the tong members may be adjusted to grasp varying sized pipe sections without crushing the same.

3. A pipe handling tool comprising a pair of spaced tong members, each of said tong members having an upper portion and a lower pipe engaging portion, a pivot pivotally connecting together intermediate portions of said tong members, said upper and lower portions of each tong member being on the same side of said pivot, a handle pivotally connected at its end portions to said upper portions of said tong members and extending therebetween, said handle being formed in sections, a pivot pivotally connecting said sections together intermediate the ends of said handle, said sections having abutting surfaces disposed below said last-mentioned pivot to form a rigid unit of said sections when upward pressure is applied to said handle, means adjustably securing said handle to at least one of said tong members whereby the tong members may be adjusted to grasp varying sized pipe sections without crushing the same, said adjustable securing means including said handle having a plurality of longitudinally spaced apertures adjacent one end thereof selectively registrable with an aperture in the upper end of one of said tong members, and a removable fastener extending through the tong member aperture and a registering handle aperture.

References Cited in the file of this patent

UNITED STATES PATENTS

| | | |
|---|---|---|
| 1,172,915 | Stevens | Feb. 22, 1916 |
| 1,966,240 | Erdahl | July 10, 1934 |
| 2,316,306 | Wyman | Apr. 13, 1943 |
| 2,368,978 | Fink | Feb. 6, 1945 |